United States Patent [19]
Henson et al.

[11] Patent Number: 6,044,956
[45] Date of Patent: Apr. 4, 2000

[54] SORTATION CONVEYOR SYSTEM FOR HIGH FRICTION ARTICLES

[75] Inventors: Mark W. Henson; Arlo S. Bromley, both of Danville, Ky.

[73] Assignee: FKI Industries, Inc., Fairfield, Conn.

[21] Appl. No.: 09/108,617

[22] Filed: Jul. 1, 1998

[51] Int. Cl.⁷ .................................................. B65G 47/10
[52] U.S. Cl. ..................... 198/370.02; 198/779
[58] Field of Search .............................. 198/890, 370.02, 198/779

[56] References Cited

U.S. PATENT DOCUMENTS

| | | | |
|---|---|---|---|
| 1,641,642 | 9/1927 | Pangborn | 198/779 |
| 3,550,756 | 12/1970 | Kornylak | 198/779 |
| 3,608,713 | 9/1971 | Crosby | 198/779 |
| 4,231,469 | 11/1980 | Arscott . | |
| 4,896,760 | 1/1990 | Triantafilou et al. . | |
| 4,981,209 | 1/1991 | Sogge . | |
| 5,092,447 | 3/1992 | Wyman . | |
| 5,145,049 | 9/1992 | McClurkin . | |
| 5,217,105 | 6/1993 | Sapp et al. . | |
| 5,240,101 | 8/1993 | Lemay et al. . | |
| 5,333,715 | 8/1994 | Sapp . | |
| 5,335,780 | 8/1994 | Watson . | |
| 5,396,977 | 3/1995 | Lantis et al. . | |
| 5,551,543 | 9/1996 | Mattingly et al. . | |

FOREIGN PATENT DOCUMENTS

443207A1  12/1993  Germany .

*Primary Examiner*—Jospeh E. Valenza
*Attorney, Agent, or Firm*—King and Schickli, PLLC

[57] ABSTRACT

In a sortation conveyor system, a main conveyor is provided with an improved transport surface that permits the substantially frictionless movement of articles in a transverse direction relative to the forward motion of the conveyor. The transport surface includes a plurality of twin slats alternating with transverse roller assemblies which support a plurality of anti-friction rollers. Both the slats and the roller assemblies are carried by side chains. The anti-friction rollers are mounted such that the upper radial surface of each extends above the twin slats for supporting the articles being conveyed. Diverters held captive on the slats slide across the surface and direct articles in a transverse direction while supported on the anti-friction rollers, this permitting substantially frictionless movement of articles to a lateral take-away conveyor.

8 Claims, 3 Drawing Sheets

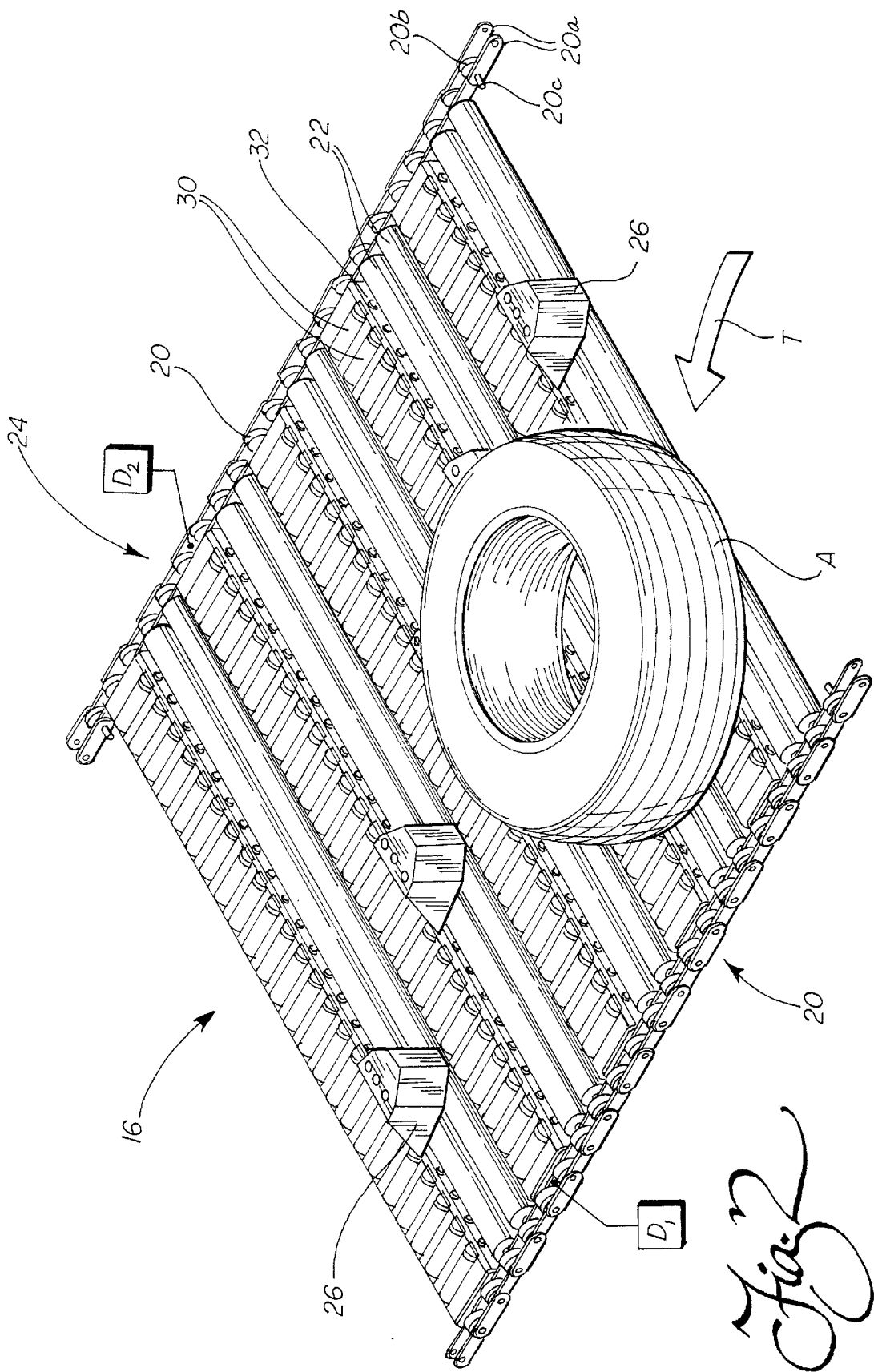

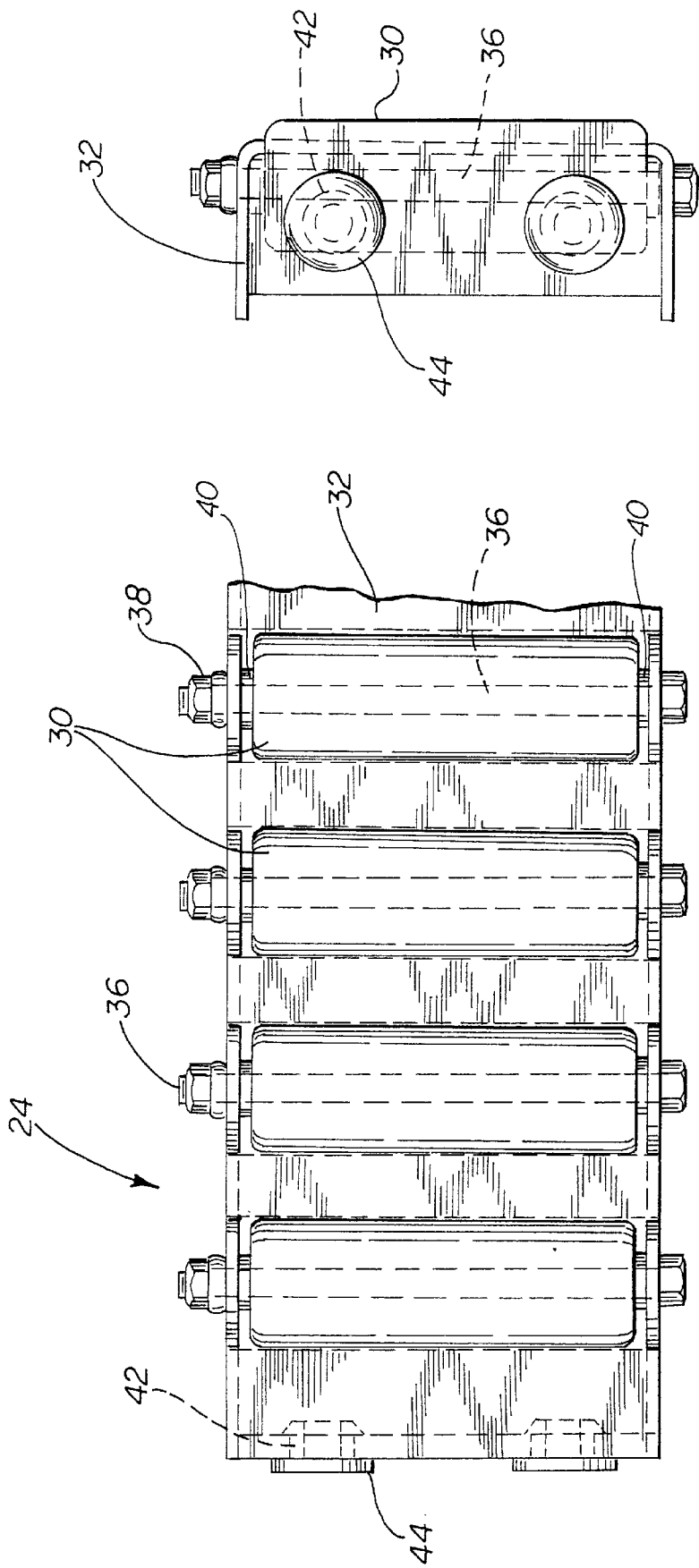

SORTATION CONVEYOR SYSTEM FOR HIGH FRICTION ARTICLES

TECHNICAL FIELD

The present invention relates generally to the conveyor art and, more particularly, to a main conveyor in a sortation conveyor system having an improved transport surface for facilitating the diversion of high friction articles to a takeaway conveyor.

BACKGROUND OF THE INVENTION

Conveyor systems for sorting articles are well-known in the art. Such systems generally comprise a main conveyor and a laterally extending takeaway conveyor for receiving selected articles. In the typical main conveyor, the transport surface for supporting and carrying the articles is formed from a plurality of elongate slats. To provide the desired sortation function, diverters are mounted on the slats and travel along with the transport surface. These diverters move transverse to the direction of conveyor travel in response to guide means positioned under the transport surface. In traversing across the main conveyor, the diverters engage and direct selected articles to the takeaway conveyor, thereby providing the desired sortation function. The slats which form the transport surface are usually tubular and, thus, articles simply slide along the upper curved extent of the slats and onto the takeaway conveyor.

Such an arrangement works well for low-friction articles; that is, articles formed of materials that do not create any significant degree of static and/or sliding friction with the slats. However, the above-described arrangement is simply not effective for use with articles having high coefficients of static/sliding friction with the slats, such as rubber tires. With such high-friction articles, excessive force is required for the diverters to overcome this friction. This tends to induce vibration of the articles, due to the intermittent sticking and release as they are pushed laterally across the slats. In some instances, the vibration can result in the articles being displaced from the intended path to the takeaway conveyor causing disruption of the entire conveying process. Furthermore, this sticking and resultant vibrating action of the conveyed articles can cause deleterious wear on system components, and thus further decreases system efficiency.

To overcome these difficulties, others have proposed forming the slats of materials having a high degree of lubricity; i.e. using low-friction coatings on the slats. One example of such a proposal is described in U.S. Pat. No. 4,896,760 to Triantafilou et al. The specific solution proposed therein includes providing the slats of a sortation conveyor with either a low friction coating or a separate sleeve formed of such materials.

First of all, it should be appreciated that many such coatings simply do not provide the desired reduction in sliding friction for some articles. For example, a popular low-friction coating marketed under the trademark TEFLON® maintains a sliding coefficient of friction with rubber of around 1.0–1.5. For heavy rubber objects, such as tires, this is simply not a sufficient reduction in friction to produce efficient lateral sliding.

Moreover, even if a reduction in sliding friction is achieved, the coatings are expensive, as well as being expensive to apply. Adding to the shortcoming of these coatings for this purpose is the fact that the coatings will ultimately wear down over time, especially where heavy, high friction articles are being conveyed. Closely associated with wear is the monitoring required to ensure that optimum frictional characteristics are consistently maintained. Any spots where the coating wears off or is improperly applied requires attention, as the exposure of any significant area of a high friction surface can grab and possibly mar the article. This condition can also lead to disruption of the conveying cycle, and create the deleterious chatter, inefficiency, and wear on system components.

Accordingly, a need is identified for a sortation conveyor system having an improved transport surface for the main conveyor that overcomes the above-described limitations and disadvantages of the prior art. The hallmark of the transport surface would be the ability to support and carry articles in a forward direction, while also permitting substantially frictionless motion in a direction transverse to conveyor travel for diversion to a takeaway conveyor. Additionally, the surface would be substantially maintenance free, simple in design, and easy to retrofit onto existing sortation conveyor systems.

SUMMARY OF THE INVENTION

Keeping the above needs in focus, it is therefore a primary object of the present invention to provide a sortation conveyor system that overcomes the above-described limitations and disadvantages of prior art systems.

Still another object is to provide an improved transport surface for a main conveyor in a sortation conveyor system that effectively supports and carries articles, while also providing a substantially frictionless surface allowing diversion of articles transverse to the direction of conveyor travel.

An additional object is to provide a sortation conveyor having a substantially frictionless transport surface that is of simple, yet durable, construction and virtually maintenance free.

A further object is to provide an improved transport surface that is easy to retrofit into existing sortation conveyor systems.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a sortation conveyor system includes a main conveyor having an improved transport surface. The transport surface efficiently supports and carries articles longitudinally along the main conveyor, and also facilitates the ease with which articles are diverted laterally to a takeaway conveyor. The improved transport surface is particularly valuable for diverting heavier articles that exert a high degree of static and/or sliding friction when in contact with the tubular steel slats typically used in sortation conveyors. As will be further appreciated from reviewing the disclosure which follows, the transport surface offers the mechanical solution of substituting rolling friction for static/sliding friction to provide very low resistance to the initial breakaway, as well as continued movement in the diversion of articles transverse to the direction of conveyor travel.

In the sortation conveyor system of the present invention, a main conveyor is provided to move articles in a longitudinal or forward direction along a path defined by a conveyor frame. The main conveyor includes a transport surface which serves to support and carry the articles being conveyed. In addition, the transport surface supports diverters which serve to move the articles in a lateral or transverse direction.

To provide the desired substantially frictionless transverse movement, or greatly reduced frictional interaction movement, the transport surface is formed from a plurality of transverse roller assemblies alternated with diverter supporters, such as twin slats typically used in sortation conveyors. In the preferred embodiment, the roller assemblies include a plurality of individual anti-friction rollers rotatably mounted to an elongate support bracket. The rollers are positioned such that the radial extent of each is above both the planar surface of the supporting bracket and the twin slats. This ensures that contact is made with the underside of the articles being conveyed. As should be appreciated, the rotation of the transversely mounted rollers in response to contact with the underside of the articles being conveyed provides induced rolling, rather than static and/or sliding friction. As described further below, this arrangement facilitates both initial breakaway and continued movement in a direction transverse to conveyor travel. This desired action occurs while the articles continue to move with a forward component along with the transport surface.

To selectively divert articles from the main conveyor to the takeaway conveyor, diverters are mounted in between the twin slats. The diverters are carried with the transport surface and laterally shift along the slats in response to guide or cam means positioned under the transport surface. Through this lateral shifting across the transport surface, the diverters engage and direct articles across the transverse roller assemblies to the takeaway conveyor.

As should now be appreciated, the articles carried by the transport surface are preferably carried exclusively on the upper surfaces of the transverse rollers. The ends of the rollers are mounted in the bracket so as to freely rotate in response to the combined lateral and downward (gravity) forces created by the motion of the article. Thus, the article selected for diversion easily moves along the transverse rollers, across the main conveyor, and to the takeaway conveyor. Advantageously, the rolling contact between the articles and rollers is substantially frictionless. Even when the articles being conveyed would otherwise provide a high degree of friction with the rollers (i.e. rubber on steel), the movement is smooth and always under control. The substantially frictionless rollers thus serve to improve efficiency, reduce article vibration/chatter created by high sliding friction, minimize conveyor system downtime, and generally enhance operation of the conveyor system.

Drive means are also provided to support and carry the transport surface along the frame. In addition to a typical drive motor/sprocket arrangement, the drive means includes opposed roller chains disposed in side tracks formed along both sides of the main conveyor frame. The opposed ends of the slats and brackets are secured to the roller chains on extended pins extending from the roller elements. Each bracket of the transverse roller assembly is specifically adapted to connect to the respective roller chain in the same manner as the slats. This advantageously permits the transverse roller assemblies to be easily retrofitted on existing conveyors by simply replacing the alternating twin slats. As should be appreciated, the cooperation between the drive sprocket and at least one of the roller chains serves to propel the transport surface in a forward direction along the frame.

It can also be appreciated that advancements in bearing technology permit the anti-friction rollers to be constructed such that they are substantially maintenance free. Thus, unlike the low-friction coatings or sleeves of the prior art, once placed in service, anti-friction rollers require little or no maintenance for the life of the conveyor system. This is an important consideration in eliminating deleterious conveyor downtime and the concomitant decrease in production efficiency.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and, together with the description, serve to explain the principles of the invention. In the drawings:

FIG. 2 is a perspective of the transport surface of the present invention, including the twin slats alternating with the transverse roller assemblies, and further illustrating the laterally shifting diverters pushing an article transverse to the direction of conveyor travel;

FIG. 3 is a top view of a single transverse roller assembly which forms a part of the transport surface of the present invention; and FIG. 4 is an end view of the transverse roller assembly shown in FIG. 3, illustrating in particular the means for mounting the transverse roller assembly which permits it to be easily retrofitted into transport surfaces of existing sortation conveyors.

Figure 1:
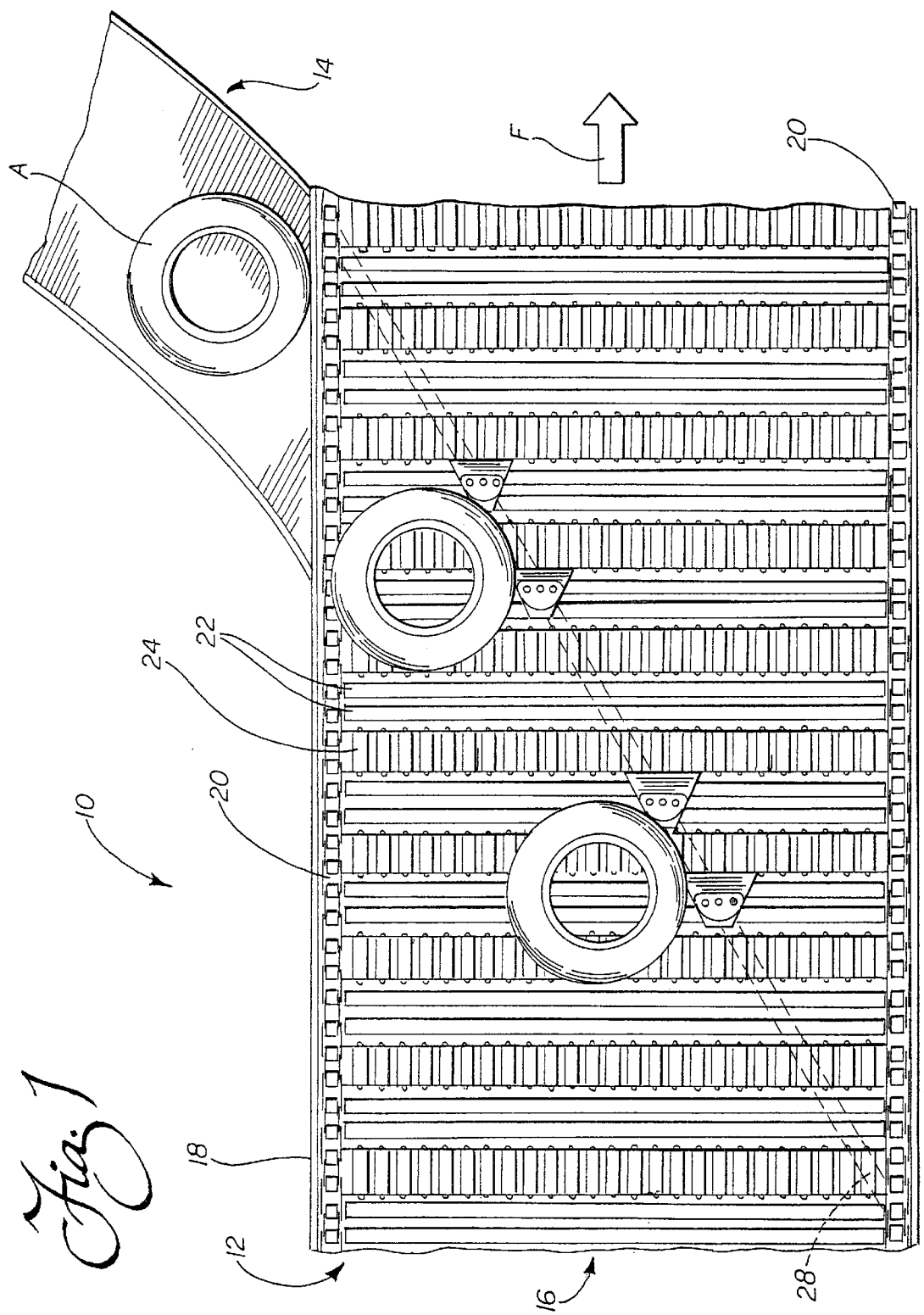
FIG. 1 is a top plan view of a sortation conveyor system illustrating the diversion of articles, such as rubber tires, transversely across a main conveyor to a lateral takeaway conveyor, and further showing in phantom view the means for guiding the diverters laterally across the slats.

Reference will now be made in detail to the present preferred embodiment of the invention, an example of which is illustrated in the accompanying drawings.

DETAILED DESCRIPTION OF THE INVENTION

To illustrate a preferred embodiment of the present invention, reference is now made to FIG. 1 showing a sortation conveyor system 10 including a main conveyor line 12 and a lateral takeaway conveyor 14. As is well-known in the prior art, such a system 10 design is of particular benefit where the selective diversion of conveyed articles A is desired. Specific details of the construction and operation of an exemplary sortation conveyor system 10 may be found in commonly assigned U.S. Pat. Nos. 5,217, 105 and 5,333,715, the disclosures of which are incorporated herein by reference.

The main conveyor 12 includes a frame 18 for supporting and carrying a transport surface 16. Opposed roller chains 20 disposed in guide tracks (not shown) formed in the frame 18 serve to support and carry the transport surface 16. The roller chains 20 are formed from a plurality of links 20a holding captive individual bearing rollers 20b (FIG. 2). Fixed extended pins 20c extend through the rollers 20b and serve to interconnect the pairs of links 20a with succeeding staggered pairs to form each chain 20. Drivers $D_1$ and $D_2$ (FIG. 2) that typically include a motor and sprocket provide even movement of the transport surface 16. The use of rollers 20b riding in the guide tracks advantageously enhances the smooth operation and also serves to improve overall operational efficiency by reducing friction.

The construction of the transport surface 16 is best illustrated in FIG. 2. The surface 16 is formed from a plurality of diverter supporters in the form of twin slats 22, alternating with transverse roller assemblies 24. The ends of both the slats 22 and the roller assemblies 24 are mounted to the individual extended pins 20c of roller chains 20. Thus, as the roller chains 20 are driven by the drivers $D_1$ and $D_2$ along the guide tracks formed in the frame 18, the transport surface 16 is propelled along the frame 18, thereby carrying articles A in a forward direction F (see action arrow in FIG. 1).

The transport surface 16 also includes diverters 26 that are held captive for sliding movement between the twin slats 22. More specifically, the diverters 26 shift laterally to push articles A in a transverse direction across the transport surface 16 (see action arrow T in FIG. 2). To perform this function, the diverters 26 are provided with depending members, such as cam followers (not shown), that ride in guide means 28, such as cam tracks (shown in phantom in FIG. 1). To provide the desired diversion, the guide means 28 extend diagonally under the transport surface 16. Thus, as the transport surface 16 drives forward F, diagonal guide means 28 cause the diverters 26 to laterally shift across the pairs of slats 22 to engage and direct articles A to the takeaway conveyor 14. It should be appreciated that the interaction between diverters 26 and guide means 28 provide the desired sortation function, which may further include divert switches that permit selective control, as more particularly described in the above-referenced '105 and '715 patents.

The roller assemblies 24 include a plurality of transversely mounted rollers 30 mounted in spaced apertures formed in an elongate bracket 32 (FIG. 3). Means for mounting serve to secure each individual roller 30 in the respective aperture of the bracket 32. As illustrated, the preferred mounting means includes a roller support shaft 36 having a head and opposed threaded end for receiving a securing nut 38. As should be appreciated, the support shaft 36 is fixed in bracket 32, and thus serves as an axle upon which the roller 30 freely rotates normal to the longitudinal axis of the bracket 32. Integral or separate spacers 40, are preferably provided along both sides of the rollers 30 to prevent any contact with the sides of bracket 32 which may disrupt smooth operation.

As best illustrated in FIG. 4, the rollers 30 are positioned such that the radial extent of each raises above the planar upper surface of bracket 32. It should also be appreciated that the rollers 30 are positioned higher than the twin slats 22. Thus, an article A being conveyed rests on the rollers 30. This ensures that the article A is exclusively supported by rollers 30 to provide free-rolling, substantially frictionless, travel during lateral shifting across the transport surface 16 to the takeaway conveyor 14. However, as the rollers are fixedly mounted and preferably formed of steel, the upper surface exhibits relatively high-friction characteristics, such that articles A cannot shift or slide in the forward or rearward direction. This is important in ensuring the proper consistent forward component of movement for conveying, as well as the diversion of articles A to the takeaway conveyor 14 in an efficient manner.

In operation, the articles A travel from an upstream station along the main line 12 of the sortation conveying system 10. When the sortation function is desired, the selected article A is pushed by the corresponding diverters 26 in a direction transverse to conveyor travel. In response to the combined pushing force and the downward gravitational force created by the weight of the article A, the rollers 30 rotate to provide rolling, rather than sliding, friction. Of course, rolling friction substantially reduces the force required to move the articles A, especially where heavy, high friction articles, such as large rubber tires, are being conveyed. Thus, the articles A are easily diverted from any point on the conveyor 12 and directed to the takeaway conveyor without reducing system efficiency. It should also be appreciated that the combined pushing by diverters 26 and rolling friction does not induce any rotation about a vertical axis in the article being conveyed, thereby ensuring a smooth transition to the takeaway conveyor 14. Moreover, the rollers 30 have smooth upper surfaces which cannot mar the articles A as lateral shifting occurs.

To facilitate installation into existing sortation conveyor systems 10, the transverse roller assemblies 24 are provided with a pair of apertures 42 at both ends for receiving the respective extended pins 20c extending from the roller chains 20. Both apertures 42 are preferably provided with deformable, snap-fit connectors 44 that receive an individual shaft 20c and ensure proper spacing between the end of the bracket 32 and the roller chain 20.

In the preferred embodiment, as shown and described in the accompanying drawings, the rollers 30 are sized and spaced for use on relatively large, articles A, such as tires. However, it should be appreciated that roller dimensions 30 may be increased or decreased to accommodate articles A of different sizes of shapes without departing from the principles of the present invention.

In summary, the improved transport surface 16 is provided for use in a main conveyor line 12 of a sortation conveyor system 10. The transport surface 16 includes the plurality of twin slats 22 alternating with the transverse roller assemblies 24 which support a plurality of rollers 30 (see FIGS. 2 and 3). The slats 22 and the roller assemblies are carried by roller chains 20 which ride in opposed guide tracks in the support frame 18 (FIG. 1). The rollers 30 are mounted such that the upper surface of each extends above the twin slats 22 for supporting the articles A being conveyed. The diverters 26 mounted on the slats 22 engage and direct articles in a transverse direction along the rollers (action arrow T in FIG. 2). The rollers 30 provide rolling friction between the article and the transport surface 16, which advantageously permits substantially frictionless movement across the main conveyor 12 to a lateral takeaway conveyor 14.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. In a sorting conveyor system having diverters for diverting articles from a main conveyor to a takeaway conveyor, the main conveyor including a transport surface propelled along a conveying path by drive means, said transport surface comprising:

a plurality of diverter supporters;

a plurality of transverse roller assemblies associated with said supporters for carrying the articles being conveyed;

said diverters being selectively moveable along the respective supporter for engaging and directing articles across said transverse roller assemblies to the takeaway conveyor;

whereby said transverse roller assemblies provide a substantially frictionless surface for diverting articles to the takeaway conveyor.

2. The conveyor system of claim 1, wherein each of said transverse roller assemblies further includes a plurality of anti-friction rollers rotatably mounted to a support bracket, whereby said rollers are positioned such that the upper radial extent of each is above said bracket and said diverter supporters for ensuring contact with the underside of the articles being conveyed.

3. The conveyor system of claim 2, wherein said diverter supporters each includes twin slats extending transversely across said transport surface.

4. The conveyor system of claim 3, wherein said drive means comprises:

a pair of roller chains, each of said chains carrying an adjacent end of said plurality of twin slats and transverse roller assemblies, whereby said chains support and carry said transport surface along said path.

5. In a sorting conveyor system for diverting articles along a conveying path from a main conveyor to a takeaway conveyor, comprising:

a transport surface for conveying and supporting articles, said transport surface including a plurality of twin slats alternating with a plurality of transverse roller assemblies;

means for driving said transport surface along said frame;

diverters held captive between said twin slats of said transport surface, said diverters selectively moveable for engaging and directing articles across said transverse roller assemblies to the takeaway conveyor; and means for sliding said diverters along said twin slats.

6. The sorting conveyor system of claim 5, wherein said drive means comprises:

a pair of roller chains, each of said chains carrying an adjacent end of said plurality of twin slats and transverse roller assemblies; and drive means cooperating with at least one of said roller chains, whereby said roller chains support and carry said transport surface along said path.

7. The sorting conveyor system of claim 6, wherein said twin slats are tubes extending between said pair of roller chains.

8. A sortation conveyor system adapted for diverting articles along a conveying path, comprising:

a main conveyor having a transport surface for supporting and conveying articles, said transport surface including a plurality of twin slats alternating with a plurality of transverse roller assemblies;

means for driving said transport surface along said path;

diverters held captive between said twin slats;

means for sliding said diverters along said slats; and a takeaway conveyor positioned adjacent to said main conveyor for receiving articles from said main conveyor, whereby said diverters are selectively slidable along said slats to engage and direct articles across said transverse roller assemblies of said main conveyor to said takeaway conveyor, said transverse roller assemblies providing a substantially frictionless surface for diverting articles across said main conveyor.

* * * * *